Jan. 21, 1969  M. D. DOLAN  3,423,116

LATCH MECHANISM FOR A SLIDABLE SASH

Filed Sept. 9, 1966

INVENTOR.

Milton D. Dolan

BY

Edward E. James

ATTORNEY

United States Patent Office 3,423,116
Patented Jan. 21, 1969

3,423,116
LATCH MECHANISM FOR A SLIDABLE SASH
Milton D. Dolan, Union Lake, Mich., assignor to General Motors Corporation, Detroit, Mich., a corporation of Delaware
Filed Sept. 9, 1966, Ser. No. 578,286
U.S. Cl. 292—165   4 Claims
Int. Cl. E05c *1/12, 3/22*

ABSTRACT OF THE DISCLOSURE

A vehicle body sliding window is provided with latch mechanism for selectively engaging spaced locking shoulders on the window track. The latch mechanism comprises a pawl which is reciprocably mounted within a housing and is biased outwardly to a locking position. The pawl is retractable to an unlatched position by a pair of levers pivoted to the housing on either side of the pawl and each having an end slidingly engaging a cam surface of the pawl. An operating handle is pivoted to the housing and includes a pair of depending cam members which alternately engage the other ends of the levers upon pivotal movement of the handle from a neutral position to alternate extreme positions to retract the pawl. Manual operation of the handle is such that one motion both unlatches and slides the window.

---

This invention relates to a latch mechanism and more particularly to a latch mechanism adapted to lock and maintain a slidable panel or sash in various adjusted positions relative to a panel supporting member or frame.

Latch mechanisms of the type indicated are often used in motor vehicles and the like to lock slidably mounted window sashes in closed and adjustable opened positions relative to a window opening provided in the vehicle body. Such sash locking mechanisms are often difficult to lubricate and are usually exposed to any condensation occurring on the inside of the window. Resultant corrosion and surface galling, aggravated by the common use of dissimilar metals in the several latch elements, tend to destroy the appearance and operational efficiency of these latch mechanisms in time and often result in complete operational failure of the unit.

Previous sash locking mechanisms for slidable vehicle windows have generally been difficult to operate due to the limited pawl retracting leverage and prehensive size and shape provided by the various latch operators. These size and leverage factors have usually been aggravated by the limited accessibility afforded the vehicle passenger thus tending to make it difficult to shift the window sash even after the latch has been released.

Alternate "right" and "left" hand latches are usually required for vertically slidable window sashes. Similar alternate latch mechanisms are often required for the overlapping fore and aft window sashes currently used in modern motor buses or coaches. These modern bus windows are slidably mounted for horizontal opening and closing movement relative to a vertical window opening provided in the coach or bus body. Any required use of such alternate latch mechanisms necessarily increases manufacturing and service inventory costs and often tends to complicate latch assembly and installation on window sashes intended for use on opposite sides of the vehicle.

The several contemplated objects of the instant invention broadly include provision of an improved lock or latch mechanism for a slidably mounted panel or sash. These objects further and more specifically include provision of an improved latch mechanism accommodating both "right" and "left" hand installation on a slidable panel or sash; having a common latch operator of improved leverage and prehensive characteristics; having a common latch and window operator which is shiftable initially to retract a sash or panel locking pawl with minimal effort and then serving to actuate the slidable sash or panel in either direction relative to its supporting frame or member; and having cooperating major components formed of wear and impact resistant, self-lubricating structural plastic thereby eliminating moisture induced corrosion and surface galling problems and generally improving the aesthetic appearance and operational service life of the latch.

For illustrative purposes, a latch mechanism embodying the several aspects of the invention is herein shown and described in conjunction with a window sash slidably mounted in a window opening frame of a vehicle body. For the various reasons indicated above, the illustrative latch mechanism has particular utility in such a vehicle window application. However, its use is not deemed to be so restricted. It will be apparent that such a latch mechanism may be advantageously used in conjunction with any slidably mounted panel or closure member.

The illustrative sash locking mechanism includes a lock housing mountable on the frame of a window sash. A pawl is slidably mounted by the housing and normally spring biased outwardly to effect window locking engagement with shoulders spaced longitudinally of the window opening frame. The pawl is retractable to release the window by alternate actuation of either of a pair of bellcrank levers pivotally mounted within the housing on opposite sides of the pawl. Such pawl retracting actuation of the bellcrank levers is effected by two lever engaging cams depending from an opearting handle. The handle laterally embraces and encloses the upper portion of the housing and is pivotally mounted for rocking or limited swinging movement about an axis normal to the plane of window movement. Thus the sash may be unlocked and shifted by rocking and pushing the handle in either direction. The primary components of the illustrative embodiment are preferably formed of a suitable self-lubricating structural plastic.

The foregoing and other objects, advantages and features of the invention will be apparent from the following description of the illustrative embodiment having reference to the accompanying drawing, in which.

Figure 4:
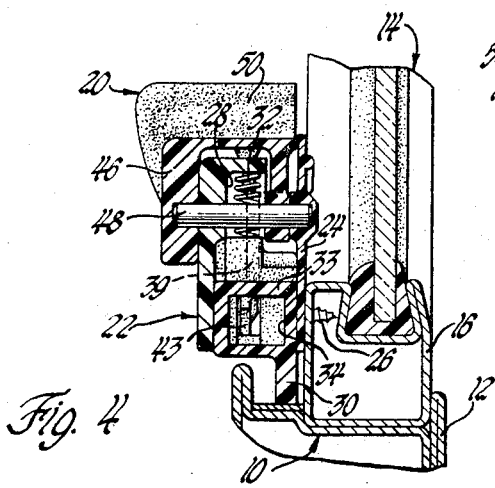
FIGURE 4 is a transverse sectional view of the latch mechanism taken substantially in the plane indicated at 4—4 of FIGURE 2.

Referring more particularly to the drawing, a window opening portion of a motor vehicle body is partially shown and indicated by the reference numeral 10. A multiple channel forming member 12 frames the window opening and slidably mounts two window sashes, only one being partially shown at 14, in vertical side-by-side relation for horizontal fore and aft opening and closing movement in an opposite direction. As best shown in FIGURE 4, the glass pane of each sash is sealingly mounted in a tubular metal frame 16. The frame is in turn slidably mounted in one of the guide channels of the window opening frame 12.

A window locking latch mechanism embodying the invention is indicated generally by the reference numeral 20 and includes a primary housing member 22 and a plate 24 closing the back of the housing member. These lock housing members are secured to the frame 16 of the window sash by suitable means, such as screws indicated at 26. The housing member 22 forms a central guide channel 28. This channel opens downwardly and outwardly toward the housing attached window and is laterally flanked by two recesses opening upwardly and outwardly of the housing.

A pawl 30 is reciprocably mounted in the central guide channel of the housing. Two parallel springs 32 are compressively interposed between the closed upper end of the housing channel and normally bias the pawl between a retracted position shown in FIGURE 3 and an extended window locking position shown in FIGURES 2 and 4. An opening 34 of rectangular cross section extends through the channel mounted portion of the pawl 30 and forms an arcuate pawl actuating surface 33. The pawl engaging side walls of the housing channel are longitudinally slotted at 35 and 36 in mating alignment with the pawl opening.

Figure 1:
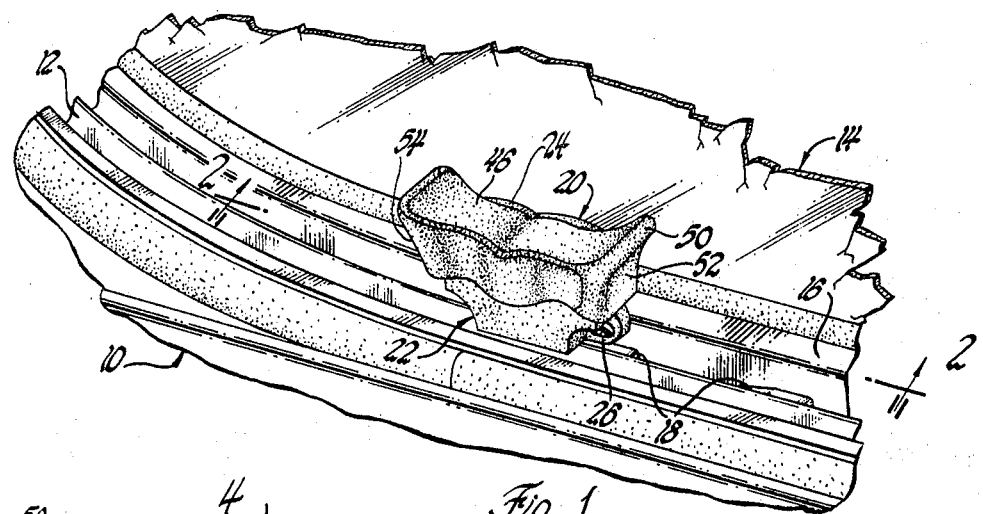
FIGURE 1 is a fragmentary perspective view showing a framed window opening portion of a vehicle body having a window sash slidably mounted for horizontal opening and closing movement and including the illustrative latch and window operating mechanism.
Figure 2:
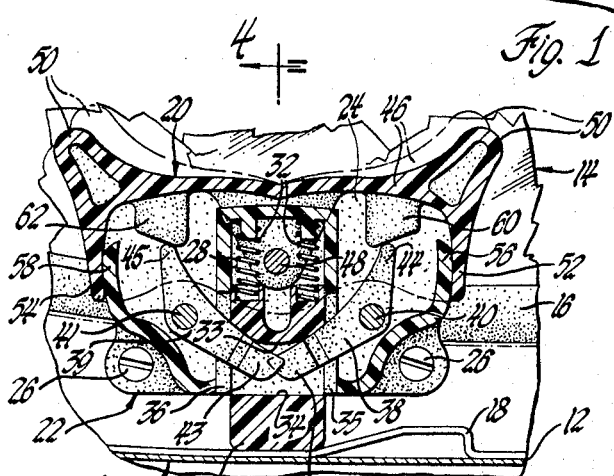
FIGURE 2 is an enlarged sectional view taken substantially in the plane indicated at 2—2 in FIGURE 1 and shows the several elements of the latch mechanism in their window locking, latched position.

The extended pawl normally engages a flange extending laterally of the adjacent window opening frame or guide channel 12. As best shown in FIGURES 1 and 2, this pawl engaging flange or frame portion may be suitably formed to provide a plurality of longitudinally spaced notches or shoulders 18. These shoulders are adapted to engage the extended pawl and thus cooperate to lock the window sash either in its closed position or in several latch maintained opened positions.

Two pawl retracting levers 38 and 39 are pivotally mounted at 40 and 41, respectively, within the laterally spaced recesses of the housing. These two levers have offset, internested lower arm portions 42 and 43, respectively, which project into the pawl opening 34 through the housing slots 35 and 36. The lever arms 42 and 43 are thus adapted to effect pawl retracting engagement with the arcuate surface 33 on the pawl. Each bellcrank lever 38 and 39 has a second handle actuated arm 44 and 45, respectively, extending upwardly of the housing.

A combined latch and window operating handle 46 is pivotally mounted relative to the housing 22 and the backing plate 24 by a pivot pin 48 extending normally of the plane of window movement. The handle encloses the open upper end of the housing and has two angularly disposed thumb or finger gripping ears 50 formed to provide optimum prehensive characteristics. Laterally spaced depending sidewalls 52 and 54 of the handle are arcuately formed about the axis of the pivot pin 48 and slidably embrace cooperating sidewalls 56 and 58 of the housing 22. The handle 46 is thus pivotally mounted for limited swinging or rocking movement relative to the housing.

Figure 3:
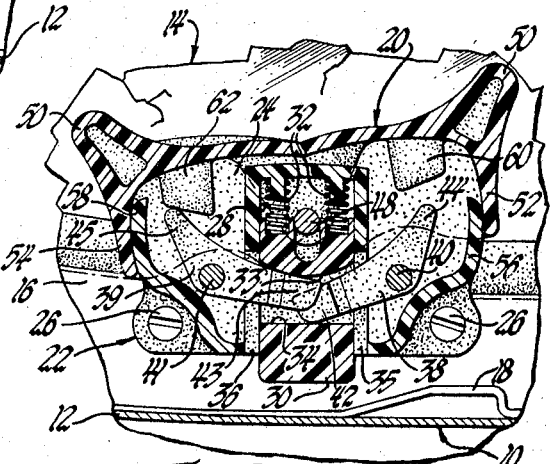
FIGURE 3 is a view similar to FIGURE 2 but showing the several latch elements in pawl-retracting, window-shifting positions.

As best shown in FIGURES 2 and 3, the handle has two depending cam lugs 60 and 62. When the spring biased pawl is extended to its normal window locking position, the depending cam lugs on the handle normally engage the upper arms 44 and 45 and thus cooperate to establish a neutral handle position. Rocking of the handle in either direction from its intermediate neutral position causes the depressed cam lug to rotate the adjacent bellcrank lever in a direction swinging its lower arm upwardly. As shown in FIGURE 3, such handle actuated lever movement carries the pawl upwardly toward its retracted position and thus releases the window for subsequent movement by the handle. Any window actuating force applied to the handle is transmitted to the window frame 16 through the housing supported pivot pin 48 and the interengaging sidewalls 52, 54 and 56, 58 of the handle and housing, respectively.

The housing 22, backing plate 24, the handle 46, the pawl 30, and the pawl retracting levers 38 and 39 are preferably formed of a suitable self-lubricating structural plastic. The screws 26 and the pivot pins 40, 41 and 48 are preferably formed of stainless steel. The pawl biasing springs are preferably formed with a suitable protective coating. Such components obviate the problems of surface galling and corrosion and cooperate to improve the operating characteristics and service life of the illustrative latch mechanism.

From the foregoing description of the illustrative embodiment, it will be seen that the invention provides an improved latch mechanism of simple design which is fully capable of providing the several stated objects and advantages of the invention. It will be further apparent that various changes and modifications might be made in the disclosed structure without departing from the spirit and scope of the invention as defined in the following claims.

I claim:

1. In combination with a panel mounted on a support for sliding movement relative thereto, a latch mechanism comprising, latching means mounted on the support, a housing mounted on the panel, a latching pawl mounted on the housing for movement between an extended position engaging the latching means to latch the panel to the support and a retracted position disengaging the latching means to permit sliding movement of the panel, means biasing the pawl to extended position, a pair of pawl operators mounted on the housing and engaging the pawl, each operator being actuatable to move the pawl to retracted position, and a handle mounted on the housing for movement between a neutral position and alternate extreme positions, the handle including actuating portions for alternately actuating the pawl operators in the alternate extreme handle positions to move the pawl to retracted position, the handle including portions abutting the housing in each extreme handle position, so that a force moving the handle to alternate extreme positions tends to effect sliding movement of the panel in alternate directions relative to the support.

2. The combination of claim 1, wherein the pawl operators are levers pivoted to the housing on either side of the pawl, each lever having one end engaging the pawl, and the handle is pivoted to the housing, the handle actuating portions alternately engaging the other ends of the levers to pivot the levers and retract the pawl upon pivotal movement of the handle from neutral to alternate extreme positions.

3. The combination of claim 1, wherein the pawl is mounted on the housing for reciprocating movement between extended and retracted positions and includes a cam surface, the operators each including a portion slidably engaging the cam surface when actuated to move the pawl to retracted position.

4. The combination of claim 1, wherein the latching pawl is mounted on the housing for reciprocating movement between extended and retracted positions and includes a cam surface, the pawl operators comprise a pair of bell crank levers pivoted to the housing on either side of the pawl and each having one end slidably engaging the pawl cam surface, and the handle is mounted on the housing for pivotal movement between the neutral and extreme positions about an axis normal to the pawl and window movement, the actuating portions comprising depending members mounted on the handle adjacent the lever other ends and engageable therewith upon handle movement to pivot the levers and move the pawl to retracted position, whereby a force pivoting the handle to either extreme position, whereby a force pivoting the handle to either extreme position effects movement of the pawl to retracted position and effects sliding movement of the panel relative to the support.

References Cited

UNITED STATES PATENTS 3,124,380   3/1964   Carlston _____ 292—163
3,249,379   5/1966   Ross _____ 292—336.3

FOREIGN PATENTS 492,136   3/1954   Italy.

RICHARD E. MOORE, *Primary Examiner.*
JOHN R. MOSES, *Assistant Examiner.*